United States Patent
Wu et al.

(10) Patent No.: US 8,577,155 B2
(45) Date of Patent: Nov. 5, 2013

(54) SYSTEM AND METHOD FOR DUPLICATE TEXT RECOGNITION

(75) Inventors: Tat Ming Damein Wu, Hong Kong (HK); Ka Yeung Sin, Hong Kong (HK)

(73) Assignee: Wisers Information Limited, Hong Kong (HK)

( * ) Notice: Subject to any disclaimer, the term of this patent is extended or adjusted under 35 U.S.C. 154(b) by 1023 days.

(21) Appl. No.: 12/619,690

(22) Filed: Nov. 17, 2009

(65) Prior Publication Data

US 2010/0254613 A1    Oct. 7, 2010

(30) Foreign Application Priority Data

Apr. 7, 2009    (CN) .......................... 2009 1 0134840

(51) Int. Cl.
*G06K 9/00*    (2006.01)
*G06K 9/36*    (2006.01)
*G06F 7/00*    (2006.01)
*G06F 17/00*    (2006.01)

(52) U.S. Cl.
USPC ........... 382/217; 382/168; 382/172; 382/292; 707/748; 715/256

(58) Field of Classification Search
USPC ......... 382/118, 112, 168, 172, 171, 176, 178, 382/181, 183, 190, 224, 225, 232, 253, 254, 382/276, 292, 321; 704/260, 2, 268, 10, 704/E13.013, 254, 9, 267; 707/740, 707/999.003, E17.058, 999.102, 999.01, 707/999.004, 999.006, 999.001, 999.007, 707/999.1, 999.201, 917, E17.108, 707/999.202, 999.002, 999.005, 770, 707/E17.009, E17.075, E17.005, 797, 741, 707/748; 715/256, 259, 243, 236

See application file for complete search history.

(56) References Cited

U.S. PATENT DOCUMENTS

| | | | | |
|---|---|---|---|---|
| 5,124,931 A | * | 6/1992 | Iwamatsu et al. | 716/112 |
| 5,819,260 A | * | 10/1998 | Lu et al. | 707/700 |
| 5,890,177 A | * | 3/1999 | Moody et al. | 715/210 |
| 6,968,537 B2 | * | 11/2005 | Abdelhadi et al. | 717/106 |
| 6,978,419 B1 | * | 12/2005 | Kantrowitz | 715/209 |
| 7,519,221 B1 | * | 4/2009 | Nicholson | 382/181 |
| 7,623,715 B2 | * | 11/2009 | Filatov et al. | 382/229 |
| 8,347,393 B2 | * | 1/2013 | Jagdale et al. | 726/25 |

FOREIGN PATENT DOCUMENTS

CN    101315622 A    12/2008

OTHER PUBLICATIONS

First Office Action of Chinese Patent Application No. 200910134840.6.

* cited by examiner

*Primary Examiner* — Sheela Chawan

(57) ABSTRACT

A system for duplicate text recognition includes a first means for dividing an electronic text into a plurality of phrase segments; a second means for converting each of the phrase segments into a unique and fixed-length bit string; a third means for storing a plurality of groups of the bit strings, each group of bit strings (string group) including a plurality of bit strings respectively corresponding to the phrase segments in a particular electronic text; and a fourth means for determining whether a predefined similarity between any two string groups in the third means reaches a first threshold, and for determining the two electronic texts corresponding to the two string groups are duplicate texts if the predefined similarity between the two string groups reaches the first threshold.

20 Claims, 5 Drawing Sheets

```
Dow     9,712.28
Nasdaq  2,122.42
S&P 500    1,057.08

Copyright © 2009 XYZ Inc. All rights reserved.
All information provided "as is" for informational purposes only, not intended for
trading purposes or advice. Neither XYZ nor any of independent providers is liable
for any informational errors, incompleteness, or delays, or for any actions taken in
reliance on information contained herein. By accessing the XYZ site, you agree not
to redistribute the information found therein.
```

FIG. 3

```
10-Yr Bond 3.307%
NYSE Volume    4,942,167,000
Nasdaq Volume  2,373,121,000

Copyright © 2009 XYZ Inc. All rights reserved.
All information provided "as is" for informational purposes only, not intended for
trading purposes or advice. Neither XYZ nor any of independent providers is liable
for any informational errors, incompleteness, or delays, or for any actions taken in
reliance on information contained herein. By accessing the XYZ site, you agree not
to redistribute the information found therein.
```

FIG. 4

SYSTEM AND METHOD FOR DUPLICATE TEXT RECOGNITION

CROSS-REFERENCE TO RELATED APPLICATIONS

This application claims the benefit of Chinese Patent Application No. 200910134840.6, filed on Apr. 7, 2009; the contents of which is hereby incorporated by reference.

FIELD OF THE PATENT APPLICATION

The present invention generally relates to text processing technologies and more particularly to a system and a method for recognizing duplicate text in an electronic document.

BACKGROUND

With the development of information technologies and especially the Internet, more and more information is stored and transmitted in the form of electronic text in an electronic document. For example, in a web page, the text for a reader to read is typically saved as a HTML (Hyper Text Markup Language) file, which is stored in a remote server and loaded to the reader's computer when being read.

Many of the electronic texts currently available are duplicate texts. For one example, the same disclaimer text may appear in a series of financial information disclosures. For another example, a portion of an article may be copied to different places of a series of other articles. In some situations, it is desired to recognize and filter out duplicate portions in an electronic text in order to make reading the text more comfortable and less time consuming.

SUMMARY

The present patent application is directed to a system for duplicate text recognition. In one aspect, the system includes a first means for dividing an electronic text into a plurality of phrase segments; a second means for converting each of the phrase segments into a unique and fixed-length bit string; a third means for storing a plurality of groups of the bit strings, each group of bit strings (string group) including a plurality of bit strings respectively corresponding to the phrase segments in a particular electronic text; and a fourth means for determining whether a predefined similarity between any two string groups in the third means reaches a first threshold, and for determining the two electronic texts corresponding to the two string groups are duplicate texts if the predefined similarity between the two string groups reaches the first threshold.

The system may further include a fourth means for assigning a unique content identification (ID) to the electronic text, and a fifth means for determining a group identification (ID) for the string group corresponding to the electronic text and for storing the group ID along with the string group in the third means.

In one embodiment, the fifth means is configured for determining whether a comparison string group that shares the predefined similarity with the string group corresponding to the electronic text that reaches the first threshold exists in the third means, and determining the group ID for the string group corresponding to the electronic text accordingly.

In another embodiment, the system further includes a sixth means for filtering noise in the string groups stored in the third means. When the number of string groups with the same group ID in the third means reaches a second threshold, the sixth means is configured to examine whether some bit strings in the string groups are noise and if they are to delete those bit strings from the string groups.

The system may further include a seventh means for further dividing the phrase segments into individual terms; an eighth means for calculating a term weighing parameter for each term based on the location where the term appears in the text and the frequency of the term's appearance; a ninth means for calculating a phrase weighing parameter for each phrase segment based on the calculated term weighing parameters for the terms contained in the phrase segment; and a tenth means for clearing any bit string corresponding to a phrase segment with the calculated phrase weighing parameter less than a third threshold from the string group that contains the bit string.

In another aspect, the present patent application provides a machine-readable medium having stored thereon data representing a sequence of instructions for duplicate text recognition, the sequence of instructions which, when executed by a processor, cause the processor to perform: (a) dividing an electronic text into a plurality of phrase segments; (b) converting each of the phrase segments into a unique and fixed-length bit string; (c) storing in a search engine a plurality of groups of the bit strings, each group of bit strings (string group) including a plurality of bit strings respectively corresponding to the phrase segments in a particular electronic text; (d) determining whether a predefined similarity between any two string groups in the search engine reaches a first threshold; (e) determining the two electronic texts corresponding to the two string groups are duplicate texts if the predefined similarity between the two string groups reaches the first threshold; and (f) determining the two electronic texts corresponding to the two string groups are not duplicate texts if the predefined similarity between the two string groups is less than the first threshold.

In yet another aspect, the present patent application provides a system for duplicate text recognition. The system includes a segmentation unit for dividing an electronic text into a plurality of phrase segments; a conversion unit connected with the segmentation unit and configured for converting each of the phrase segments into a unique and fixed-length bit string; a search engine connected with the conversion unit and configured for storing a plurality of groups of the bit strings, each group of bit strings (string group) including a plurality of bit strings respectively corresponding to the phrase segments in a particular electronic text; and a judgment unit connected with the search engine, the judgment unit being configured for determining whether a predefined similarity between any two string groups in the search engine reaches a first threshold, for determining the two electronic texts corresponding to the two string groups are duplicate texts if the predefined similarity between the two string groups reaches the first threshold, and for determining the two electronic texts corresponding to the two string groups are not duplicate texts if the predefined similarity between the two string groups is less than the first threshold.

BRIEF DESCRIPTION OF THE DRAWINGS

FIG. 3 shows the content of an electronic text for being processed by the system depicted in FIG. 2.

FIG. 4 shows the content of another electronic text for being processed by the system depicted in FIG. 2.

DETAILED DESCRIPTION

Reference will now be made in detail to a preferred embodiment of the system and the method for duplicate text recognition disclosed in the present patent application, examples of which are also provided in the following description. Exemplary embodiments of the system and the method for duplicate text recognition disclosed in the present patent application are described in detail, although it will be apparent to those skilled in the relevant art that some features that are not particularly important to an understanding of the system and the method for duplicate text recognition may not be shown for the sake of clarity.

Furthermore, it should be understood that the system and the method for duplicate text recognition disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
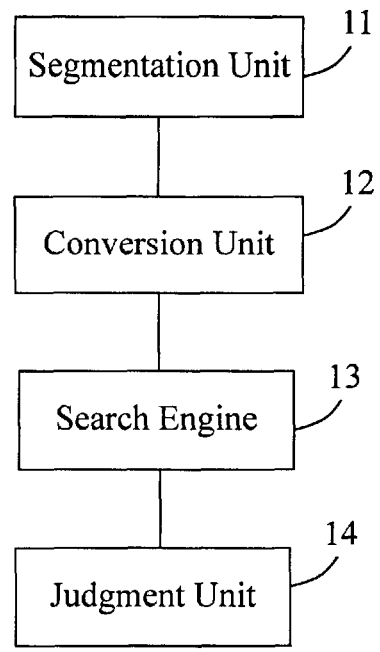
FIG. 1 is a block diagram of a system for duplicate text recognition according to an embodiment of the present patent application.

FIG. 1 is a block diagram of a system for duplicate text recognition according to an embodiment of the present patent application. Referring to FIG. 1, the system includes a segmentation unit 11, a conversion unit 12, a search engine 13 and a judgment unit 14 consecutively connected with one another. The segmentation unit 11, the conversion unit 12, the search engine 13 and the judgment unit 14 may be physically configured in the same device, or be respectively configured in multiple connected devices.

The segmentation unit 11 is configured to divide the content of an electronic text into a plurality of phrase segments according to the punctuations in the text. The punctuations, as the basis of the segmentation, may be period, comma, semicolon, question mark, exclamation mark and so on. For example, if the text is "Though stocks traded with broadbased gains, there wasn't much behind them. Trading volume on the NYSE fell to its lowest level in one month, coming in below 1 billion shares.", the phrase segments resulted from the segmentation may be "though stocks traded with broadbased gains", "there wasn't much behind them", "trading volume on the NYSE fell to its lowest level in one month", and "coming in below 1 billion shares".

The conversion unit 12 is configured to convert each of the above-mentioned phrase segments into a unique and fixed-length number sequence or bit string. In this embodiment, as an example, a cryptographic hash function may be used in such conversion. The search engine 13 is configured to store a plurality of groups of bit strings. Each group of bit strings, or each string group, includes a plurality of bit strings respectively corresponding to the phrase segments in a particular electronic text.

When a predefined similarity between two string groups in the search engine 13 reaches a first threshold, the judgment unit 14 is configured to determine that the electronic texts corresponding to the two string groups are duplicate texts. The predefined similarity may, for example, be the number of identical bit strings in the two string groups. In another example, the predefined similarity may be the percentage of the identical bit strings in each of the two string groups. It is understood that the similarity may be predefined in other ways. The first threshold may be predetermined based on the required accuracy for duplicate text recognition. If a higher accuracy is required, a higher threshold may be chosen. In this embodiment, because all the content of the texts is converted to the fixed-length bit strings for comparison, the complexity of the text comparison is reduced and the comprehensiveness of the text comparison is improved.

Figure 2:
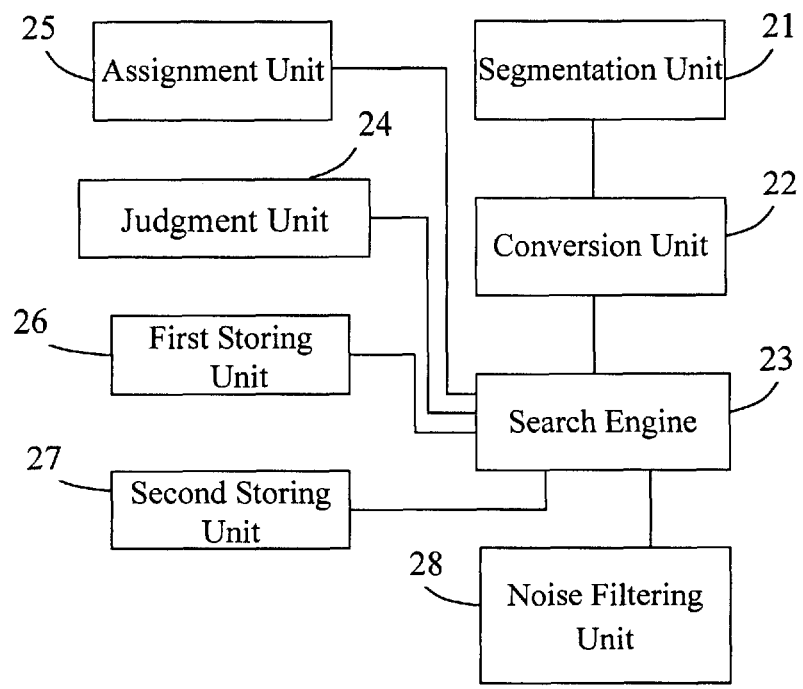
FIG. 2 is a block diagram of a system for duplicate text recognition according to another embodiment of the present patent application.

FIG. 2 is a block diagram of a system for duplicate text recognition according to another embodiment of the present patent application. Referring to FIG. 2, comparing to the system depicted in FIG. 1, the system for duplicate text recognition in this embodiment further includes an assignment unit 25, a noise filtering unit 28, a first storing unit 26 and a second storing unit 27, all of which are respectively connected with the search engine 23.

The assignment unit 25 is configured for assigning a unique content identification (ID) to an electronic text. When the predefined similarity between a string group corresponding to the electronic text and any one of the string groups stored in the search engine 23 is less than the first threshold, the first storing unit 26 is configured to store the content ID of the electronic text as a group identification (ID) for the string group corresponding to the electronic text, along with the string group corresponding to the electronic text itself, in the search engine 23. When the maximum value of the predefined similarity between the string group corresponding to the electronic text and all the string groups stored in the search engine 23 is equal to or greater than the first threshold, the second storing unit 27 is configured to store the group ID of the string group in the search engine 23 that has the maximum predefined similarity with the string group corresponding to the electronic text as the group ID of the string group corresponding to the electronic text, along with the string group corresponding to the electronic text itself, in the search engine 23.

When the number of string groups with the same group ID in the search engine 23 reaches a second threshold, the noise filtering unit 28 is configured to examine whether some bit strings in such string groups are noise, and if they are, to delete those bit strings from the string groups. For example, when a majority of the string groups with the same group ID all includes a common bit string, such common bit string may be examined against a database of bit strings corresponding to phrases that are likely to be noise, such as "we think", "according to the statistics", phrases in a typical copyright statement, phrases in a typical disclaimer and so on.

In this embodiment, the judgment unit 24 is configured to make a judgment on the similarity between the string groups with the same group ID after noise has been taken out by the noise filtering unit 28, and to determine whether the electronic texts corresponding to the string groups are duplicate texts based on such judgment, in the same way the judgment unit 14 operates in the embodiment illustrated in FIG. 1.

FIG. 3 and FIG. 4 respectively show the content of two electronic texts for being processed by the system depicted in FIG. 2. Referring to FIG. 3 and FIG. 4, although the two electronic texts share a substantial portion of their content in common, which is a copyright statement and a disclaimer, the two texts are not duplicate texts. When the texts are processed by the system depicted in FIG. 2, the group IDs of the string groups corresponding to the two texts will be made identical by the second storing unit 27. When the number of string groups with the same group ID in the search engine 23 reaches the second threshold, the noise filtering unit 28 will clear the bit strings corresponding to the copyright statement and the disclaimer from the two string groups corresponding to the two texts as noise, and thereby ensures the accuracy of duplicate text recognition.

Figure 5:
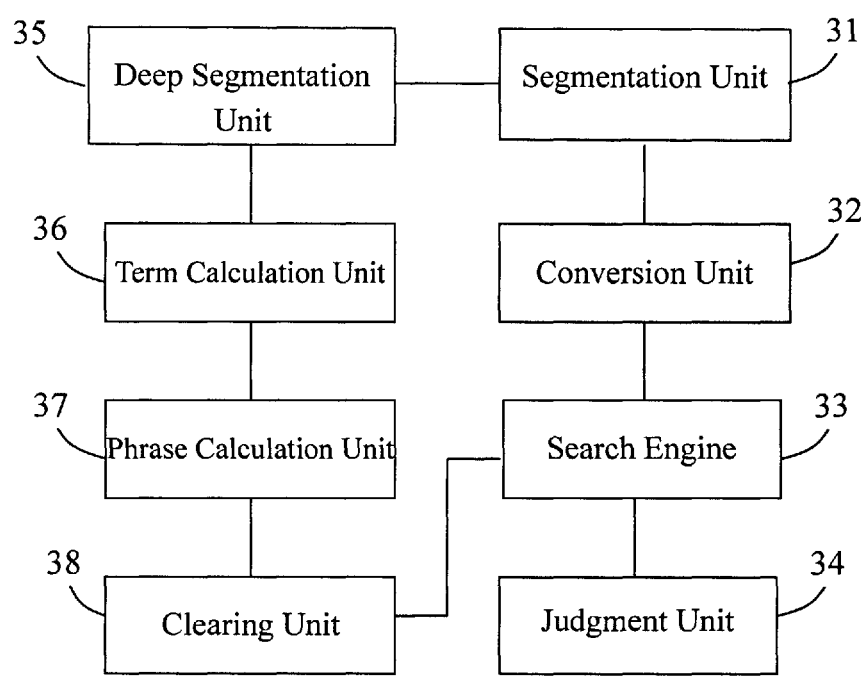
FIG. 5 is a block diagram of a system for duplicate text recognition according to yet another embodiment of the present patent application.

FIG. 5 is a block diagram of a system for duplicate text recognition according to yet another embodiment of the present patent application. Referring to FIG. 5, comparing to the embodiment depicted in FIG. 1, the system in this embodiment further includes a deep segmentation unit 35, a term calculation unit 36, a phrase calculation unit 37, and a clearing unit 38 consecutively connected to one another. The deep segmentation unit 35 is connected with the segmentation unit 31. The clearing unit 38 is connected with the search engine 33.

The deep segmentation unit 35 is configured to further divide a phrase segment resulted from the operation of the segmentation unit 31 into individual terms. The terms can be nouns, verbs, and etc. The term calculation unit 36 is configured to calculate a term weighing parameter for each term based on the location where the term appears in the text (such as the title, the first paragraph of the body text, the last paragraph of the body text and etc.) and the frequency of the term's appearance. The phrase calculation unit 37 is configured to calculate a phrase weighing parameter for each phrase segment based on the term weighing parameters calculated by the term calculation unit 36 for the terms contained in the phrase segment. The clearing unit 38 is configured to clear any bit string corresponding to a phrase segment with the calculated phrase weighing parameter less than a third threshold from the string group that contains the bit string. In this embodiment, through deep segmentation and processing the weighing parameters, the accuracy of duplicate text recognition can be further improved.

Figure 6:
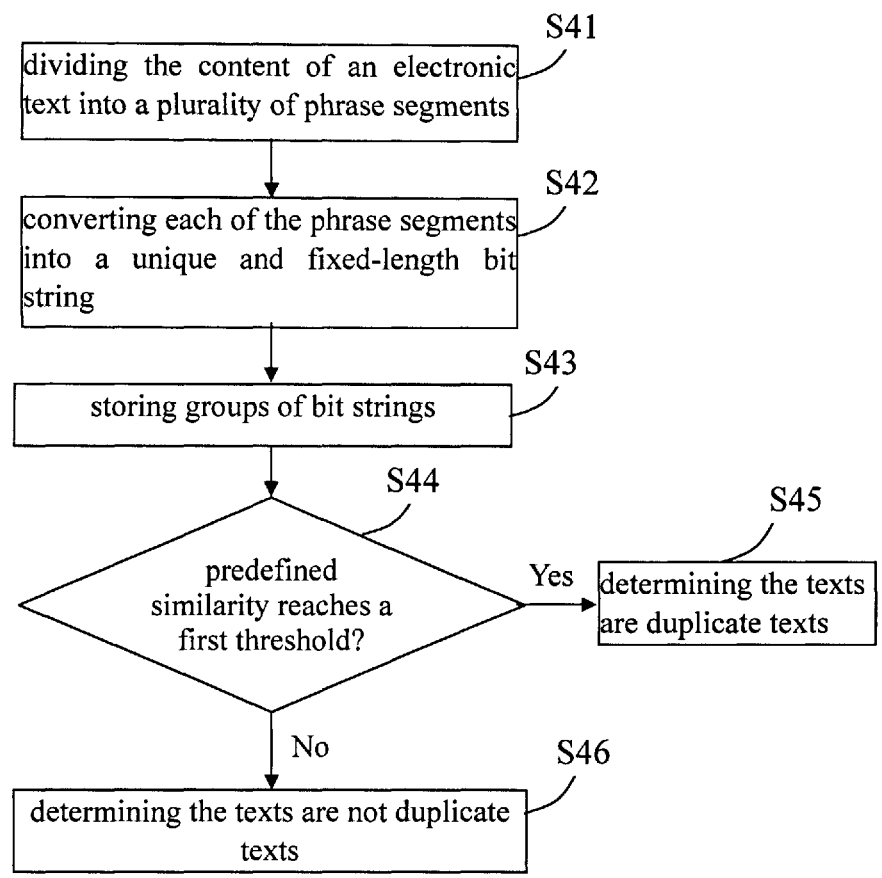
FIG. 6 is a flow chart illustrating a method for duplicate text recognition according to still another embodiment of the present patent application.

FIG. 6 is a process flow chart illustrating a method for duplicate text recognition according to still another embodiment of the present patent application. Referring to FIG. 6, the method includes:

S41: dividing the content of an electronic text into a plurality of phrase segments according to the punctuations in the text. The punctuations, as the basis of the segmentation, may be period, comma, semicolon, question mark, exclamation mark and so on.

S42: converting each of the phrase segments into a unique and fixed-length bit string. In this embodiment, as an example, a cryptographic hash function may be used in such conversion.

S43: storing a plurality of groups of such bit strings in a search engine, each group of bit strings (string group) including a plurality of bit strings respectively corresponding to the phrase segments in the same electronic text.

S44: determining whether a predefined similarity between any two string groups in the search engine reaches a first threshold; if the predefined similarity reaches the first threshold, going to step S45; if the predefined similarity does not reach, i.e. less than the first threshold, going to step S46. The predefined similarity may, for example, be the number of identical bit strings in the two string groups. In another example, the predefined similarity may be the percentage of the identical bit strings in each of the two string groups. It is understood the similarity may be predefined in other ways. The first threshold may be predetermined based on the required accuracy for duplicate text recognition. If a higher accuracy is required, a higher threshold may be chosen.

S45: determining the two electronic texts corresponding to the two string groups are duplicate texts.

S46: determining the two electronic texts corresponding to the two string groups are not duplicate texts.

In this embodiment, because all the content of the texts is converted to the fixed-length bit strings for comparison, the complexity of the text comparison is reduced and the comprehensiveness of the text comparison is improved.

Figure 7:
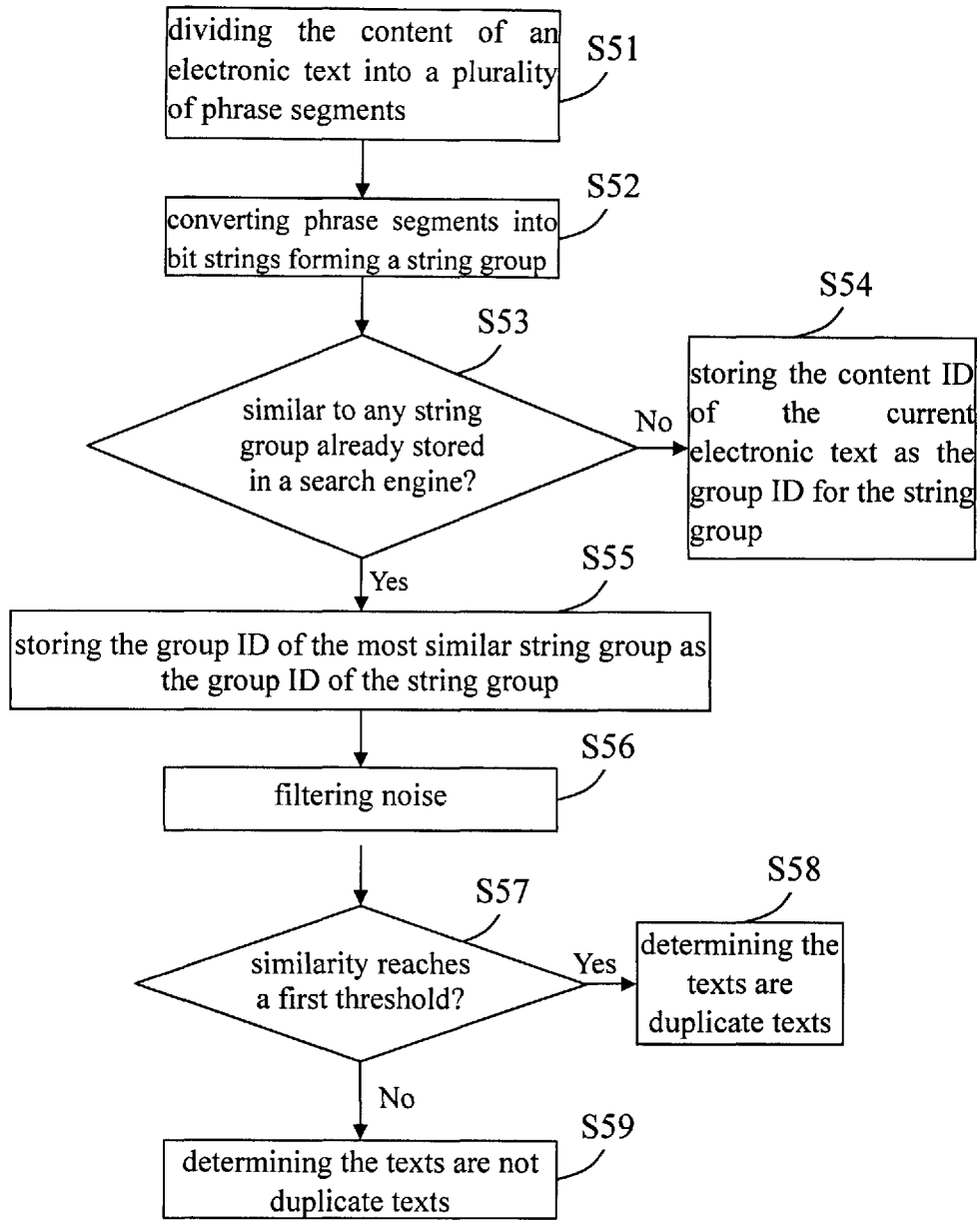
FIG. 7 is a flow chart illustrating a method for duplicate text recognition according to still another embodiment of the present patent application.

FIG. 7 is a process flow chart illustrating a method for duplicate text recognition according to still another embodiment of the present patent application. Referring to FIG. 7, the method includes:

S51: assigning a unique content identification (ID) to an electronic text, and dividing the content of the electronic text into a plurality of phrase segments according to the punctuations in the text. The punctuations, as the basis of the segmentation, may be period, comma, semicolon, question mark, exclamation mark and so on.

S52: converting each of the phrase segments into a unique and fixed-length bit string. In this embodiment, as an example, a cryptographic hash function may be used in such conversion.

S53: determining whether any string group sharing a predefined similarity with the string group corresponding to the electronic text that reaches a first threshold exists in a search engine. If such a string group does not exist, going to step S54; if such a string group exists, going to step S55. The predefined similarity may, for example, be the number of identical bit strings in the two string groups. In another example, the predefined similarity may be the percentage of the identical bit strings in each of the two string groups. It is understood the similarity may be predefined in other ways. The first threshold may be predetermined based on the required accuracy for duplicate text recognition. If a higher accuracy is required, a higher threshold may be chosen.

S54: storing a content ID of the electronic text as a group identification (ID) for the string group corresponding to the electronic text, along with the string group corresponding to the electronic text itself, in the search engine.

S55: storing the group ID of the string group in the search engine that has the maximum similarity with the string group corresponding to the electronic text as the group ID of the string group corresponding to the electronic text, along with the string group corresponding to the electronic text itself, in the search engine.

S56: filtering noise in the string groups stored in the search engine. The noise filtering process includes when the number of string groups with the same group ID in the search engine 23 reaches a second threshold examining whether some bit strings in such string groups are noise and if they are deleting those bit strings from the string groups. For example, when a majority of the string groups with the same group ID all includes a common bit string, such common bit string may be examined against a database of bit strings corresponding to phrases that are likely to be noise, such as "we think", "according to the statistics" and so on.

S57: determining whether the predefined similarity between two string groups with the same group ID after noise has been filtered out reaches the first threshold; if yes, going to step S58; if not, going to step S59.

S58: determining the two electronic texts corresponding to the two string groups are duplicate texts.

S59: determining the two electronic texts corresponding to the two string groups are not duplicate texts.

In still another embodiment of the present application, step S41 illustrated in FIG. 6 further includes: further dividing the phrase segments into individual terms, which may be nouns, verbs, and etc.; calculating a term weighing parameter for each term based on the location where the term appears in the text (such as the title, the first paragraph of the body text, the last paragraph of the body text and etc.) and the frequency of the term's appearance; and calculating a phrase weighing parameter for each phrase segment based on the term weighing parameters for the terms contained in the phrase segment. In addition, in this embodiment, step S43 illustrated in FIG. 6 further includes clearing any bit string corresponding to a phrase segment with the calculated phrase weighing parameter less than a third threshold from the string group that contains the bit string. As a result, after such clearing process, the above-mentioned bit string will not exist in the string group stored in the search engine.

The method for duplicate text recognition according to the embodiments of the present patent application may be implemented as a computer program product which may include a machine readable medium having stored thereon instructions which can be used to program a computer (or other electronic devices) to perform a process according to the embodiments. The machine readable medium may include, but is not limited to, floppy disks, optical disks, cd-roms, magneto-optical disks, ROMS, RAMS, EPROMS, EEPROMS, magnetic or optical cards, or any type of media/machine readable medium suitable for storing electronic instructions.

While the present patent application has been shown and described with particular references to a number of embodiments thereof, it should be noted that various other changes or modifications may be made without departing from the scope of the present invention.

What is claimed is:

1. A system for duplicate text recognition comprising: a first means for dividing an electronic text into a plurality of phrase segments; a second means for converting each of the phrase segments into a unique and fixed-length bit string; a third means for storing a plurality of groups of the bit strings, each group of bit strings (string group) comprising a plurality of bit strings respectively corresponding to the phrase segments in a particular electronic text; and a fourth means for determining whether a predefined similarity between any two string groups in the third means reaches a first threshold, and for determining the two electronic texts corresponding to the two string groups are duplicate texts if the predefined similarity between the two string groups reaches the first threshold.

2. The system for duplicate text recognition of claim 1 further comprising a fourth means for assigning a unique content identification (ID) to the electronic text, and a fifth means for determining a group identification (ID) for the string group corresponding to the electronic text and for storing the group ID along with the string group in the third means.

3. The system for duplicate text recognition of claim 2, wherein the fifth means is configured for determining whether a comparison string group that shares the predefined similarity with the string group corresponding to the electronic text that reaches the first threshold exists in the third means, and determining the group ID for the string group corresponding to the electronic text accordingly.

4. The system for duplicate text recognition of claim 3, wherein the fifth means is configured for determining the group ID for the string group corresponding to the electronic text to be the content ID of the electronic text if the comparison string group does not exist in the third means, and for determining the group ID for the string group corresponding to the electronic text to be the group ID of the string group in the third means that has the maximum similarity with the string group corresponding to the electronic text if the comparison string group exists in the third means.

5. The system for duplicate text recognition of claim 2 further comprising a sixth means for filtering noise in the string groups stored in the third means, wherein when the number of string groups with the same group ID in the third means reaches a second threshold, the sixth means is configured to examine whether some bit strings in the string groups are noise and if they are to delete those bit strings from the string groups.

6. The system for duplicate text recognition of claim 5, wherein when the number of string groups with the same group ID in the third means reaches the second threshold and a majority of the string groups with the same group ID comprise a common bit string, the sixth means is configured to examine the common bit string against a database of bit strings corresponding to phrases that are likely to be noise.

7. The system for duplicate text recognition of claim 1 further comprising: a seventh means for further dividing the phrase segments into individual terms; an eighth means for calculating a term weighing parameter for each term based on the location where the term appears in the text and the frequency of the term's appearance; a ninth means for calculating a phrase weighing parameter for each phrase segment based on the calculated term weighing parameters for the terms contained in the phrase segment; and a tenth means for clearing any bit string corresponding to a phrase segment with the calculated phrase weighing parameter less than a third threshold from the string group that contains the bit string.

8. A non-transitory computer readable media having stored thereon data representing a sequence of instructions for duplicate text recognition, the sequence of instructions which, when executed by a processor, cause the processor to perform: (a) dividing an electronic text into a plurality of phrase segments; (b) converting each of the phrase segments into a unique and fixed-length bit string; (c) storing in a search engine a plurality of groups of the bit strings, each group of bit strings (string group) comprising a plurality of bit strings respectively corresponding to the phrase segments in a particular electronic text; (d) determining whether a predefined similarity between any two string groups in the search engine reaches a first threshold; (e) determining the two electronic texts corresponding to the two string groups are duplicate texts if the predefined similarity between the two string groups reaches the first threshold; and (f) determining the two electronic texts corresponding to the two string groups are not duplicate texts if the predefined similarity between the two string groups is less than the first threshold.

9. The non-transitory computer readable media of claim 8, wherein the sequence of instructions, when executed by a processor, cause the processor to further perform: (g) assigning a unique content identification (ID) to the electronic text; and (h) determining a group identification (ID) for the string group corresponding to the electronic text and for storing the group ID along with the string group in the search engine.

10. The non-transitory computer readable media of claim 9, wherein step (h) comprises: (i) determining whether a comparison string group that shares the predefined similarity with the string group corresponding to the electronic text that reaches the first threshold exists in the search engine; and (j) determining the group ID for the string group corresponding to the electronic text accordingly.

11. The non-transitory computer readable media of claim 10, wherein step (j) comprises: (k) determining the group ID for the string group corresponding to the electronic text to be the content ID of the electronic text if the comparison string group does not exist in the search engine; and (l) determining the group ID for the string group corresponding to the electronic text to be the group ID of the string group in the search engine that has the maximum similarity with the string group corresponding to the electronic text if the comparison string group exists in the search engine.

12. The non-transitory computer readable media of claim 9, wherein the sequence of instructions, when executed by a processor, cause the processor to further perform: (m) filtering noise in the string groups stored in the search engine, wherein when the number of string groups with the same group ID in the search engine reaches a second threshold, examining whether some bit strings in the string groups are noise and if they are deleting those bit strings from the string groups.

13. The non-transitory computer readable media of claim 12, wherein step (m) comprises: (n) when the number of string groups with the same group ID in the search engine reaches the second threshold and a majority of the string groups with the same group ID comprise a common bit string, examining the common bit string against a database of bit strings corresponding to phrases that are likely to be noise.

14. The non-transitory computer readable media of claim 8, wherein the sequence of instructions, when executed by a processor, cause the processor to further perform: (o) further dividing the phrase segments into individual terms; (p) calculating a term weighing parameter for each term based on the location where the term appears in the text and the frequency of the term's appearance; (q) calculating a phrase weighing parameter for each phrase segment based on the calculated term weighing parameters for the terms contained in the phrase segment; and (r) clearing any bit string corresponding to a phrase segment with the calculated phrase weighing parameter less than a third threshold from the string group that contains the bit string.

15. A system for duplicate text recognition comprising: a segmentation unit for dividing an electronic text into a plurality of phrase segments; a conversion unit connected with the segmentation unit and configured for converting each of the phrase segments into a unique and fixed-length bit string; a search engine connected with the conversion unit and configured for storing a plurality of groups of the bit strings, each group of bit strings (string group) comprising a plurality of bit strings respectively corresponding to the phrase segments in a particular electronic text; and a judgment unit connected with the search engine, the judgment unit being configured for determining whether a predefined similarity between any two string groups in the search engine reaches a first threshold, for determining the two electronic texts corresponding to the two string groups are duplicate texts if the predefined similarity between the two string groups reaches the first threshold, and for determining the two electronic texts corresponding to the two string groups are not duplicate texts if the predefined similarity between the two string groups is less than the first threshold.

16. The system for duplicate text recognition of claim 15 further comprising: an assignment unit connected with the search engine and configured for assigning a unique content identification (ID) to the electronic text; and a storing module connected with the search engine and configured for determining a group identification (ID) for the string group corresponding to the electronic text and for storing the group ID along with the string group in the search engine; wherein: the storing module is configured for determining whether a comparison string group that shares the predefined similarity with the string group corresponding to the electronic text that reaches the first threshold exists in the search engine, and determining the group ID for the string group corresponding to the electronic text accordingly.

17. The system for duplicate text recognition of claim 16, wherein the storing module comprises: a first storing unit connected with the search engine and configured for determining the group ID for the string group corresponding to the electronic text to be the content ID of the electronic text if the comparison string group does not exist in the search engine; and a second storing unit connected with the search engine and configured for determining the group ID for the string group corresponding to the electronic text to be the group ID of the string group in search engine that has the maximum similarity with the string group corresponding to the electronic text if the comparison string group exists in the search engine.

18. The system for duplicate text recognition of claim 16 further comprising a noise filtering unit connected with the search engine and configured for filtering noise in the string groups stored in the search engine, wherein when the number of string groups with the same group ID in the search engine reaches a second threshold, the noise filtering unit is configured to examine whether some bit strings in the string groups are noise and if they are to delete those bit strings from the string groups.

19. The system for duplicate text recognition of claim 18, wherein when the number of string groups with the same group ID in the search engine reaches the second threshold and a majority of the string groups with the same group ID comprise a common bit string, the noise filtering unit is configured to examine the common bit string against a database of bit strings corresponding to phrases that are likely to be noise.

20. The system for duplicate text recognition of claim 15 further comprising: a deep segmentation unit connected with the segmentation unit and configured for further dividing the phrase segments into individual terms; a term calculation unit connected with the deep segmentation unit and configured for calculating a term weighing parameter for each term based on the location where the term appears in the text and the frequency of the term's appearance; a phrase calculation unit connected with the term calculation unit and configured for calculating a phrase weighing parameter for each phrase segment based on the calculated term weighing parameters for the terms contained in the phrase segment; and a clearing unit connected with the phrase calculation unit and the search engine, and configured for clearing any bit string corresponding to a phrase segment with the calculated phrase weighing parameter less than a third threshold from the string group that contains the bit string.

* * * * *